US012572323B2

(12) United States Patent
Gura

(10) Patent No.: US 12,572,323 B2
(45) Date of Patent: Mar. 10, 2026

(54) DYNAMIC AUDIO CONTENT GENERATION

(71) Applicant: WebTalk Ltd, GaAsh (IL)

(72) Inventor: Eyal Gura, GaAsh (IL)

(73) Assignee: WebTalk Ltd, GaAsh (IL)

( * ) Notice: Subject to any disclaimer, the term of this patent is extended or adjusted under 35 U.S.C. 154(b) by 216 days.

(21) Appl. No.: 18/280,697

(22) PCT Filed: Jan. 25, 2022

(86) PCT No.: PCT/IL2022/050102
§ 371 (c)(1),
(2) Date: Sep. 7, 2023

(87) PCT Pub. No.: WO2022/190079
PCT Pub. Date: Sep. 15, 2022

(65) Prior Publication Data
US 2024/0303030 A1 Sep. 12, 2024

Related U.S. Application Data

(60) Provisional application No. 63/158,399, filed on Mar. 9, 2021.

(51) Int. Cl.
*G06F 17/00* (2019.01)
*G06F 3/16* (2006.01)
(Continued)

(52) U.S. Cl.
CPC .............. *G06F 3/165* (2013.01); *G06Q 50/01* (2013.01); *G10L 13/00* (2013.01)

(58) Field of Classification Search
CPC .......... G06F 3/165; G06Q 50/01; G10L 13/00
(Continued)

(56) References Cited

U.S. PATENT DOCUMENTS 9,456,268 B2 9/2016 Usher et al.
2010/0145976 A1* 6/2010 Higgins .............. G06F 16/3322
707/E17.069
(Continued)

FOREIGN PATENT DOCUMENTS

WO    WO 2010/065195    6/2010
WO    WO 2013/003069    1/2013
WO    WO 2022/190079    9/2022

OTHER PUBLICATIONS

International Search Report and the Written Opinion Dated May 23, 2022 From the International Searching Authority Re. Application No. PCT/IL2022/50102. (13 Pages).
(Continued)

*Primary Examiner* — Paul C Mccord

(57) ABSTRACT

There is provided a computer implemented method of dynamic generation of audio content of a panel including questions asked by a moderator and responses by responders, comprising: accessing user interest(s) of a target user, accessing a social network graph that includes the target user, selecting questions correlated with the user interest(s) of the target user, selecting responses to questions by responders, wherein the responders are linked to the target user in the social network graph, wherein the responders are associated with user interests correlated with the user interest(s) of the target user, dynamically assembling audio content(s) from voice records and/or from audio recordings generating by converting text to voice, each audio content including a sub-set of the selected questions and a sub-set of the responses, and providing dynamically assembled audio content(s) for selection thereof for playing on a speaker.

15 Claims, 6 Drawing Sheets

(51) Int. Cl.
  *G06Q 50/00*          (2012.01)
  *G10L 13/00*          (2006.01)

(58) Field of Classification Search
  USPC ........................................................... 700/94
  See application file for complete search history.

(56)                    References Cited

U.S. PATENT DOCUMENTS

| | | |
|---|---|---|
| 2015/0220715 A1 | 8/2015 | Kim |
| 2018/0096072 A1 | 4/2018 | He et al. |
| 2018/0342257 A1 | 11/2018 | Huffman |
| 2019/0050708 A1* | 2/2019 | Miyajima .............. G06Q 50/10 |
| 2021/0012222 A1* | 1/2021 | Kim ........................ G06F 40/30 |

OTHER PUBLICATIONS

Invitation to Pay Additional Fees Dated Mar. 28, 2022 From the International Searching Authority Re. Application No. PCT/IL2022/050102. (2 Pages).

\* cited by examiner

Select synthesized voice 402

Select question 404

Select responders 406

Adapt selected question according to respective responder 408

Synthesize voice of virtual moderator asking adapted question 410

Provide adapted questions to respective responders 412

Receive audio content responses recorded from responders 414

Dynamically assemble audio content 416

DYNAMIC AUDIO CONTENT GENERATION

RELATED APPLICATIONS

This application is a National Phase of PCT Patent Application No. PCT/IL2022/050102 having International filing date of Jan. 25, 2022, which claims the benefit of priority under 35 USC § 119(e) of U.S. Provisional Patent Application No. 63/158,399 filed on Mar. 9, 2021. The contents of the above applications are all incorporated by reference as if fully set forth herein in their entirety.

FIELD AND BACKGROUND OF THE INVENTION

The present invention, in some embodiments thereof, relates to automatic generation of content and, more specifically, but not exclusively, to dynamic automatic generation of audio content.

Users generate audio content by recording themselves talking into short audio files. These audio files are then either sent to other users to listen to, or are posted on sites where other users can listen. In other examples, users hold a discussion with other users over a network connection, where additional users may listen or be allowed to participate.

SUMMARY OF THE INVENTION

According to a first aspect, a computer implemented method of dynamic generation of audio content of a panel including questions asked by a moderator and responses by a plurality of responders, comprises: accessing at least one user interest of a target user, accessing a social network graph that includes the target user, selecting a plurality of questions correlated with the at least one user interest of the target user, selecting a plurality of responses to the plurality of questions by a plurality of responders, wherein the plurality of responders are linked to the target user in the social network graph, wherein the plurality of responders are associated with user interests correlated with the at least one user interest of the target user, dynamically assembling at least one audio content from voice records and/or from audio recordings generating by converting text to voice, each audio content including a sub-set of the selected plurality of questions and a sub-set of the plurality of responses, and providing at least one dynamically assembled audio content for selection thereof for playing on a speaker.

According to a second aspect, a computer implemented method of dynamic generation of audio content in response to a query, comprises: accessing a query from a client terminal of a target user, the query indicating audio content question recorded by the target user speaking into a microphone of the client terminal, accessing at least one user interest of the target user, accessing a social network graph that includes the target user, selecting a plurality of responders linked to the target user in the social network and associated with user interests correlated to the at least one user interest of the target user, distributing the query to a plurality of client terminals of the selected plurality of responders, receiving a plurality of audio content responses to the query from the selected plurality of responders, in response to a virtual moderator speaking in a synthesized voice asking the at least one audio content question of the query, wherein the plurality of responses are recorded from a plurality of microphones of the plurality of client terminals, dynamically assembling at least one audio content from the plurality of audio content responses and the query, and providing at least one dynamically assembled audio content for selection thereof for playing on a speaker of the client terminal.

According to a third aspect, a computer implemented method of dynamic generation of audio content of a panel including questions asked by a virtual moderator and responses by a plurality of responders, comprises: accessing at least one user interest of a target user, accessing a social network graph that includes the target user, selecting a synthesizing voice from a plurality of synthesizing voices documents in a voice dataset, selecting at least one question correlated with the at least one user interest of the target user, selecting a plurality of responders linked to the target user in the social network and associated with user interests correlated to the at least one user interest of the target user, for each respective responder of the selected plurality of responders: adapting the selected at least one question for the respective responder to obtain at least one adapted question, synthesizing a voice of a virtual moderator according to the selected synthesizing voice for asking the at least one adapted question by playing on a speaker of a client terminal, recording at least one audio content response to the at least one adapted question from a microphone of the client terminal, dynamically assembling at least one audio content from the adapted at least one question and the plurality of audio content responses obtained from the plurality of responders, and providing at least one dynamically assembled audio content for selection thereof for playing on a speaker of the client terminal.

In a further implementation of the first, second, and third aspects, further comprising: synthesizing a voice of a virtual moderator for asking the plurality of questions to the plurality of responders.

In a further implementation of the first, second, and third aspects, further comprising customizing the plurality of questions according to the plurality of responders asked by the virtual moderator.

In a further implementation of the first, second, and third aspects, customizing is selected from a group consisting of: addressing the respective responder by name while asking a respective question, background details of the respective responder, adding a prefix to the respective question according to an ordering of the respective question within a plurality of respective questions, adjusting the question according to a response to a previous question, and adjusting the question according to previously asked questions.

In a further implementation of the first, second, and third aspects, further comprising: playing on a speaker, audio content asking at least one question to the target user, recording via a microphone, an audio response by the target user, wherein the voice of the moderator is a synthesis of the voice of the target user generated from the audio response recorded from the target user.

In a further implementation of the first, second, and third aspects, further comprising training a generative adversarial network for synthesizing the voice of the moderator using the voice of the target user, by: training a generator network from a sample audio recording provided by the target user, to generate an outcome of audio content synthesis of the voice of the target user in response to an input of non-audio data, training a detector network from a training dataset of audio content synthesizing the voice of the target user generated by the generator network labelled with an indication of synthesis, and the recording of the audio response of the voice of the target user labelled with an indication of real voice, to generate an outcome of synthesis or real voice in response to an input of an audio content, wherein the generator network and the detector network arc jointly trained using cost functions directly opposing each other, such that the generator network generates the synthesized audio content that when fed into the detector network generates the indication of real voice, to obtain a trained generator network, and feeding non-audio data into the trained generator network to obtain the synthesized voice of the target user as the moderator as an outcome.

In a further implementation of the first, second, and third aspects, further comprising: generating a dynamic presentation temporally correlated to the at least one dynamically assembled audio content, wherein the dynamic presentation including respective visual representations for each one of the plurality of responders that depict a speaking motion temporally correlated to respective voice records and/or audio recordings of respective responders of the at least one dynamically assembled audio content; and providing the dynamic presentation for presentation on a display simultaneously and temporarily correlated with the at least one dynamic assembled audio content played on the speaker.

In a further implementation of the first, second, and third aspects, the dynamic presentation is generated for presentation in virtual reality glasses.

In a further implementation of the first, second, and third aspects, the visual representations are implemented as respective avatars that virtually simulate each respective responder.

In a further implementation of the first, second, and third aspects, the plurality of responses are obtained over a first time interval and/or out of a sequence, wherein the at least one dynamically assembled audio content has a length shorter than the time interval and/or wherein the voice records and/or audio recordings are arranged in the sequence.

In a further implementation of the first, second, and third aspects, further comprising: assigning a respective unique non-fungible token (NFT) to audio recordings selected from a group consisting of: a question asked by the target user, a response provided by a certain responder, audio recording converted from text to speech, and each dynamically assembled audio content item; and saving the respective audio recordings with assigned NFT in a blockchain, wherein the audio recordings with assigned NFT are licensable.

In a further implementation of the first, second, and third aspects, further comprising: receiving an audio content including at least one questions asked by the target user, the audio content including the at least one question labelled with an indication of the at least one user interest, forwarding the audio content including the at least one question to a selected subset of a plurality of responders linked to the target user by connections stored in the social network graph, wherein the subset is selected according to responders having user interests correlated with the at least one user interest of the audio content including the at least one question, receiving, from each of the responders of the selected subset, a respective at least one response to the audio content including the at least one question, and including in the dynamically assembled at least one audio content, the at least one question and responses to the audio content including the at least one question.

In a further implementation of the first, second, and third aspects, further comprising: playing on a speaker, at least one question generated by another user linked to the target user by connections stored in the social network graph, recording via a microphone, a response of the target user to the at least one question, the response stored as being linked to the at least one question, and including the recorded response during dynamic assembling of a new audio content of another user linked to the target user by connections stored in the social network graph, as a response to the at least one question included in the new audio content of the another user.

In a further implementation of the first, second, and third aspects, recording the response comprises: receiving a text as the response of the target user to the at least one question, and generating an audio content from the text by synthesizing a voice of the target user reading the text.

In a further implementation of the first, second, and third aspects, the at least one question is played on the speaker during playing of a selected dynamically assembled audio content, by dynamically synthesizing a voice of a moderator asking the at least one question to the target user regarding a topic being discussed.

In a further implementation of the first, second, and third aspects, the at least one question is of a plurality of pending questions stored off-line, wherein the response of the target user is recorded by a microphone in response to selection of the at least one question by the target user.

In a further implementation of the first, second, and third aspects, further comprising at least one of: (i) performing a background noise reduction on the at least one audio content item and/or the plurality of questions and/or the plurality of responses, and (ii) selecting a target background for insertion into a respective dynamically assembled audio content according to content discussed therein.

In a further implementation of the first, second, and third aspects, the plurality of responders are linked to the target user by connections indicating that the target user is following the plurality of responders.

In a further implementation of the first, second, and third aspects, the plurality of responses and the plurality of questions are obtained from a mapping dataset that maps each respective question of a plurality of questions to a plurality of responses provided by a plurality of different responders.

In a further implementation of the first, second, and third aspects, each of the plurality of questions is further labelled with an indication of at least one user interest.

In a further implementation of the first, second, and third aspects, at least some questions of the plurality of questions are further mapped to a plurality of other questions designated as a plurality of follow-up questions, the follow-up questions labelled with an indication of at least one user interest, each follow-up question mapped to a plurality of follow-up responses, wherein follow-up questions are mapped to other follow-up questions, and further comprising: selecting a sub-set of the follow-up question to the plurality of questions according to user interest correlated with the at least one user interest of the target user, selecting a sub-set of the plurality of follow-up responses to the plurality of follow-up questions according to user interest correlated with the at least one user interest of the target user, and including the sub-set of the follow-up questions and sub-set of the follow-up responses in the dynamically assembled at least one audio content.

In a further implementation of the first, second, and third aspects, further comprising: playing a selected dynamically assembled audio content on a speaker, receiving from the target user, a feedback score indicating perceived likelihood of authenticity of at least one response of at least one responder included in the dynamically assembled audio content, and when the feedback score is below a threshold, removing the at least one response of the at least one responder from a dataset that stores questions mapped to responses, for exclusion of the at least one response of the at least one user from being included in other dynamically assembled audio content.

In a further implementation of the first, second, and third aspects, a plurality of user interests are stored for each of the plurality of users, each of the plurality of user interests weighed with a selected weight, wherein the plurality of questions are correlated with an aggregation of a plurality of weighted user interests.

In a further implementation of the first, second, and third aspects, dynamically assembling at least one audio content, comprises performing a natural language processing (NLP) analysis of audio files documenting the selected plurality of questions and/or the plurality of responses, assigning a relevance score to each of the plurality of questions indicating relevance to the respective response and to the at least one user interest of the target user, and selecting the sub-set of the selected plurality of questions and the sub-set of the plurality of responses having relevance scores above a threshold.

In a further implementation of the first, second, and third aspects, selecting the plurality of responses to the plurality of questions by the plurality of responders comprises: selecting a plurality of responses for each respective question of the plurality of questions.

In a further implementation of the first, second, and third aspects, further comprising selecting additional questions documented in a dataset, correlated with the query and the at least one user interest, and distributing the selected additional questions and the query to the plurality of client terminals, wherein the virtual moderator asks the additional questions and the audio content question of the query.

In a further implementation of the first, second, and third aspects, further comprising: analyzing a certain audio content response of a certain responder using natural language processing (NLP), selecting a follow-up question document in a dataset according to the analysis of the certain audio content response, asking the follow-up question by the virtual moderator by playing on a speaker of a client terminal of the certain responder, receiving a follow-up audio content response from the certain responder recorded on a microphone of the client terminal of the certain responder, and including the follow-up audio content response and the follow-up question in the at least one dynamically assembled audio content.

In a further implementation of the first, second, and third aspects, further comprising: playing a selected dynamically assembled audio content on the speaker of the client terminal, receiving a new query recorded from the microphone of the client terminal during playing of the selected dynamically assembled audio content, iterating, for the new query the selecting the plurality of responders, the distributing, and the receiving the plurality of audio content responses, and dynamically assembling at least one new audio content from the plurality of audio content responses and the new query.

In a further implementation of the first, second, and third aspects, the plurality of synthesizing voices are recorded from at least one member of a group consisting of: the plurality of responders, the target user, and other members of the social network not selected as responders, and non-members of the social network.

In a further implementation of the first, second, and third aspects, adapting the selected at least one question comprises a member selected from a group consisting of: including a name of the respective responder, including an interest of the respective responder, selecting another synthesizing voice for the respective responder, according to questions previously asked to the respective responder, according to responses previously obtained from the respective responder, according to responses from other responders, and according to a relationship between the respective responder and the target user documented in the social network graph.

In a further implementation of the first, second, and third aspects, the voice dataset documents sample voices of famous personalities in respective specific content type, and the synthesizing voice is selected according to a correlation between a respective specific content type of a respective famous personality and specific content type of at least one of: the plurality of responders and the at least one question.

In a further implementation of the first, second, and third aspects, the dynamically assembled at least one audio content is implemented according to a member of a group consisting of: posted publicly for any user to access, privately shared only with the plurality of responders, and privately provided only to the target user, provided for single-use listening and then discarded, saved for future listening one or more times, and saved for a defined time interval after which the respective dynamically assembled audio content is made unavailable and/or discarded.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
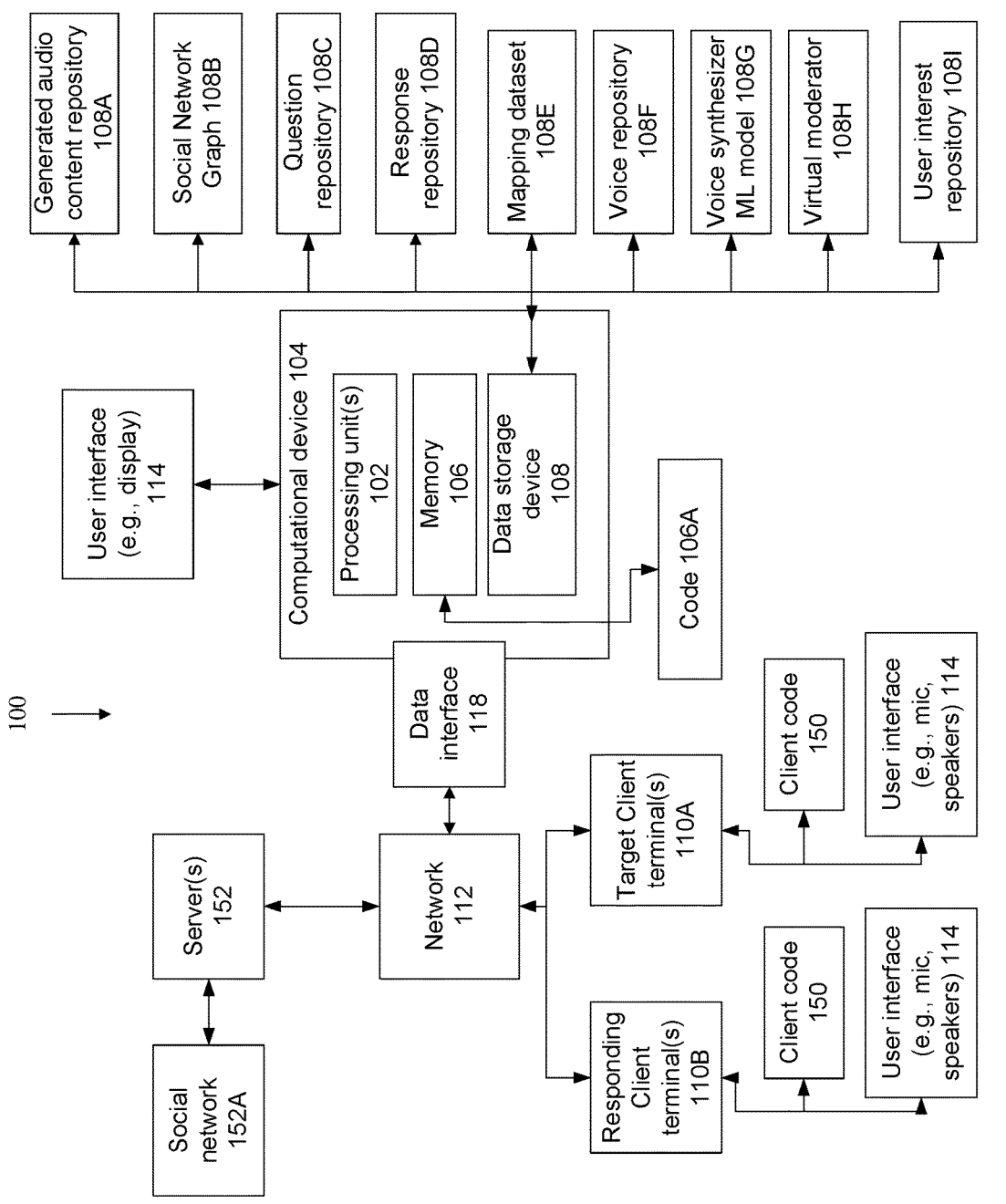
FIG. 1 is a block diagram of components of a system for dynamic generation of audio content of a panel including questions asked by a virtual moderator and responses by multiple responders, in accordance with some embodiments of the present invention.

The present invention, in some embodiments thereof, relates to automatic generation of content and, more specifically, but not exclusively, to dynamic automatic generation of audio content.

An aspect of some embodiments of the present invention relates to systems, methods, an apparatus, and/or code instructions (i.e., stored on a memory and executable by one or more processors) for dynamic generation of audio content of a panel including questions asked by a virtual moderator and responses by human responders. User interest of a target user, and a social network graph that includes the target user are accessed. Questions correlated with the user interest(s) of the target user are selected from a dataset of multiple questions correlated with different user interests. Multiple responses to the questions provided by human responders are selected. The responders are linked to the target user in the social network graph. The responders may be selected according to an association of the responders with user interests correlated with the user interest of the target user, for example, both the target user and the responders are interested in camping, which is the topic of the questions being asked. The questions and/or responses may be stored as audio content segments which are created by recording the question played on a speaker and/or recording the responses spoken into a microphone. The audio content may be tagged with an indication of the context and/or theme, for example, text and/or a code indicating the question and/or response recorded in the respective audio content. A sub-set of the selected questions and a sub-set of the selected responses are dynamically assembled into one or more audio content items, for example, according to a common context and/or theme. For example, for the target user interested in camping, one dynamically assembled audio content may be related to the topic of "How to plan the best camping trip", and another dynamically assembled audio content may relate to the topic of "What camping gear is needed for a 3 day camping trip". The audio content items are provided for playing on a speaker of a client terminal of the target user. For example, the user selects which audio content to listen to.

An aspect of some embodiments of the present invention relates to systems, methods, an apparatus, and/or code instructions (i.e., stored on a memory and executable by one or more processors) for dynamic generation of audio content in response to a query. The query may be obtained, for example, from a client terminal of a target user. The query may include and/or be synthesized to obtain, an audio content question recorded by the target user speaking into a microphone of the client terminal. For example, the target user records the query "What equipment do I need to enjoy a 3 day camping trip?". User interest(s) of the target user, and/or a social network graph that includes the target user, are accessed. Responders linked to the target user in the social network and associated with user interests correlated to the user interest of the target user are selected. The audio content query is distributed to the client terminals of the selected responders. Each responder may listen to the respective query being played over speaker(s) of the respective client terminal. A virtual moderator speaking in a synthesized voice asks the audio content question of the query to each respective responder. The virtual moderator may customize the asking of the respective audio content question to the respective responder, for example, by stating the name of the respective responder, for example, "Mike, what equipment do you think you need to enjoy a 3 day camping trip?". The synthesized voice may be of the target user, and/or other users and/or other people which may not be users (e.g., celebrities). A respective audio content response is recorded when the respective responder speaks into the microphone of the respective client terminal. Multiple audio content responses to the query are received from multiple responders. One or more audio content items may be dynamically assembled from the received audio content responses and the query. For example, in one dynamically generated audio content, the moderator with synthesized voice asks different responders what equipment they think is needed to enjoy a 3 day camping trip, providing the target user with a listening experience in which there is a discussion of the equipment that is needed to enjoy a 3 day camping trip. In another dynamically generated audio content, the discussion has shifted to the most reliable camping equipment suitable for a 3 day camping trip. The dynamically assembled audio content items are provided for selection thereof for playing on a speaker of the client terminal.

An aspect of some embodiments of the present invention relates to systems, methods, an apparatus, and/or code instructions (i.e., stored on a memory and executable by one or more processors) for dynamic generation of audio content of a panel including questions asked by a virtual moderator and responses by human responders. User interest(s) of a target user and a social network graph that includes the target user are accessed. One or more questions correlated with the user interest(s) of the target user are selected from a dataset of multiple questions correlated with different user interests. A synthesizing voice may be selected from a voice dataset documenting different synthesizing voices, for example, the voice of the target user, the voice of responders, the voice of other users, a completely artificial voice, and a voice of a human non-user (e.g., celebrity). Multiple responders linked to the target user in the social network and associated with user interests correlated to the user interest of the target user, are selected. The selected question(s) is adapted for each respective responder to obtain at least one adapted question, for example, by including the name of the respective responder, considering previous responses of the respective responder, and according to responses that other responders provided. A voice of the virtual moderator is synthesized according to the selected synthesizing voice for asking the adapted question by playing on a respective speaker of a respective client terminal of the respective responder. A respective audio content response to the respective adapted question is recorded from a respective microphone of the respective client terminal by the respective responder. One or more audio content items are dynamically assembled from the adapted question(s) asked by the virtual moderator using the synthesized voice and the audio content responses obtained from the responders. One or more audio content items are dynamically assembled for selection thereof for playing on a speaker of the client terminal of the target user.

It is noted that generation of audio content has several advantages over generation of other content such as text and/or videos. For example, audio content may be quickly and easily generated by a user by simply recording themselves speaking into a microphone. Messages which may be fairly long to type and/or read may be quickly and easily recorded into short audio files. In particular, typing text using a small touch keyboard of a smartphone is time consuming and prone to typographical errors. Audio may be recorded almost anywhere and/or in any conditions by a user, for example, while driving a car and/or while washing dishes, while videos require that the user be positioned in front of the camera and in a state that is visually presentable, for example, in front of their computer with the background shelving properly organized. Audio is also easier to listen to, since users may listen in the background while performing other tasks such as driving and washing dishes. Text and videos which require the user's eye, make the user unable to do other tasks. Text may require much more concentration and be difficult to do in certain situations such as in the dark and/or when the user is tired. Audio captures features of the speaker that are not caught in text and/or video, for example, the tone of the voice, changes of the voice, and emotions expressed via the voice. A dynamic presentation, for example, of avatars representing responders and/or the user (that asked the question and/or query) may be generated to temporally correspond to the audio. This allows the dynamic presentation to be created for each audio, rather than recording a video. The dynamic presentation makes it appear as if all the responses provided by the multiple responders are provided together and/or in sequence, during the time interval when the dynamic presentation is played, even though the responses were gathered at different times (over a time interval that is longer than the time it takes to play the dynamic presentation) and/or out of sequence.

At least some of the systems, apparatus, methods, and/or code instructions described herein address the technical problem of improving user experience of audio content generation, and/or improving the process of using audio content to obtain responses to questions. At least some of the systems, apparatus, methods, and/or code instructions described herein improve the technology of audio content generation over existing, by providing a personalized social graph and interest based audio content general process. In some existing approaches, a user records themselves using a microphone and create a short audio file. The audio file is then sent to one or more other users to listen to. The other users may then record themselves responding, and send a response audio file back to the first user to listen to. Audio files may be sent back and forth as a way of communication. In another example, a user may record themselves to create an audio file, which is then posted for other users to access, for example, on a personal profile of a social network. Other users accessing the personal profile may click on the audio file to listen to it. In yet another example, an audio content platform creates rooms where users may hold live audio discussions with one another. Additional users may simply listen to the live discussion, or may be allowed to participate. The improvement of at least some implementations described herein is the automatic generation of audio content based on multiple responses to a common question provided by responders, where the responders are selected according to a social network of a user and/or according to similar interests as the user. A synthesized moderator using a synthesized voice that emulates a voice of the user and/or another user asks questions to the responders. The responses are automatically selected and aggregated to create the personalized audio content.

At least some of the systems, apparatus, methods, and/or code instructions described herein improve the experience of a user generating audio content that includes questions and responses. Some existing approaches result in disorganized and/or scattered audio content, which the user is required to organize themselves. For example, a user records a question, such as "Do you have advice on how to generate new innovative ideas?". Other users may individual send responses. The user then listens to each response. In other existing approaches, the user may hold a network based discussion, where multiple users are simultaneously asked the question by the user, and a discussion is then held in real life. At least some implementations provided herein automatically generate audio content based on interest of the user and/or based on one or more questions provided by the user, where a synthesized moderator asks questions to different responders which have similar interests and linked to the user via a social network. The audio content is automatically assembled from the different responses to the question asked by the moderator. The user is provided with a single audio content item in which responses from different contacts with similar interests are aggregated. Another improvement is the user of an automated moderator, rather than using a live user moderator, and/or rather than the user recording themselves asking questions and sending the questions to responders. The synthesized moderator may be programmed to ask multiple different questions, such as follow-up questions, that were not originally asked by the user initiating the questions. Moreover, the synthesized moderator may be used in conjunction with a process that automatically asks questions and automatically records responses, and stores the responses in a designed dataset that maps between the questions and the responses, from which audio content is extracted to automatically generate the personalized audio content. The responses may be automatically analyzed, for example, using natural language processing (NLP) approaches, with more relevant answers included in the dynamically generated audio content and less relevant answers excluded from the dynamically generated audio content. Another improvement is that the moderator is an automated synthesized moderator which may use a synthesized voice, for example, of the user that asked the original question, other users, and/or other people such as celebrities. The synthesized moderator improves the experience of the responders, in that by hearing the voice of the user which they may know, they may be more likely to respond, and/or respond honestly. Yet other improved user experiences include the ability of the user to listen to the automatically generated audio content at will, in contrast to live discussion. Yet other improved user experiences include the ability of the responders to response to the questions at will, in contrast to live discussions. Yet another improved user experience is that the automatically generated audio content may be personalized for the user, according to the interests of the user and according to contacts of a social network of the user. Responses from contacts to questions asked by the synthesized moderator, that also share similar interests as the user, are aggregated to create the personalized audio content. Different users, even when asking the same question, are provided with different personalized generated audio content according to their social network contacts and/or according to user interests.

The user experience may be improved, for example, by generation of the dynamic presentation, which is temporally correlated with the assembled audio content. The dynamic presentation may be presented within virtual reality glasses, and/or using generated avatars, to provide a visual experience that is temporally correlated with the assembled audio content. For example, each avatar corresponding to a respective responder is generated to appear as speaking the time correlated audio content. The dynamic presentation makes it appear as if all the responses provided by the multiple responders are provided together and/or in sequence, during the time interval when the dynamic presentation is played, even though the responses were gathered at different times (over a time interval that is longer than the time it takes to play the dynamic presentation) and/or out of sequence.

At least some of the systems, apparatus, methods, and/or code instructions described herein do not simply collect data, process the data, and present the data, but provide a personalized social graph and interest based audio content general process, that generates entirely new personalized audio content by aggregating audio responses provided by responders to a synthesized moderator asking questions. The responders are selected according to a social network of a user, and/or according to similar interests as the user. Each user is present with their own personalized dynamically generated audio content.

At least some of the systems, apparatus, methods, and/or code instructions described herein address a technical problem that is unique to the technological context of audio content shared over a network and/or of social networks, that only recently arose due to improvements in network technology and does not have a long standing counterpart in the physical world. The technical problem described herein is relatively new, and recently arose due to the wide adoption of social networks by many users. Such social networks, in which users may create their own user profiles, post their own content, and are linked to other users, is a new technology that arose from the technology of networks (e.g., the internet) and has no long standing counterpart in the real physical world. The technical solution provided by at least some of the systems, apparatus, methods, and/or code instructions described herein is addressed by a specific technological context of a social network storing relationships between users.

At least some of the systems, apparatus, methods, and/or code instructions described herein provide a new user experience for a user searching for an answer to a question in the form of a query. In contrast to existing processes that simply return search results and/or return a list of possibly matching content, at least some of the systems, apparatus, methods, and/or code instructions described herein provide personalized social graph and interest based audio content generation as a result of the query. The dynamically generated audio content is assembled from responses to the query of the user provided by responders in audio format, optionally in response to a virtual moderator asking adapted questions based on the query using a synthesized voice.

At least some of the systems, apparatus, methods, and/or code instructions described herein relate to the technical problem of retrieving search results for a search query, optionally in the form of a question. At least some of the systems, apparatus, methods, and/or code instructions described herein improve the technology of search engines that search using queries. Using standard existing methods, a user looking for certain data, such as an answer to a certain question, enters a query into a search engine, optionally an internet search engine. Such traditional search engines are limited, for example, for searching for data in a certain domain based on queries within the domain (e.g., based on domain specific keywords), and/or for returning a relatively large amount of results, many of which are irrelevant to the query. In such cases, the user may need to re-word the query and re-enter the query, and/or sort through the results to find the answer to the query. When the query is entered as an audio recording, the search engine simply transcribes the audio into text, which is then searched using standard approaches. The internet search engine is dependent on data that is found online, for example, textual information stored on websites. The search engine cannot access information that is stored in the minds of users. The search engine usually returns a large number of search results to the user, for example, web sites and/or other content. The user manually examines the search results to try to determine the most relevant results. The most relevant results are further manually examined by the user in an attempt to obtain an answer to the query. Such existing search engines place a time consuming burden on the user to manually examine the search results in an attempt to find an answer to a question. At least some of the systems, apparatus, methods, and/or code instructions described herein distributed the query to responding users, which are then asked the query using a virtual moderator which may adapt the query question to each responder. The audio content responses and the questions asked by the virtual moderator are then dynamically assembled into personalized audio content for the querying user.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
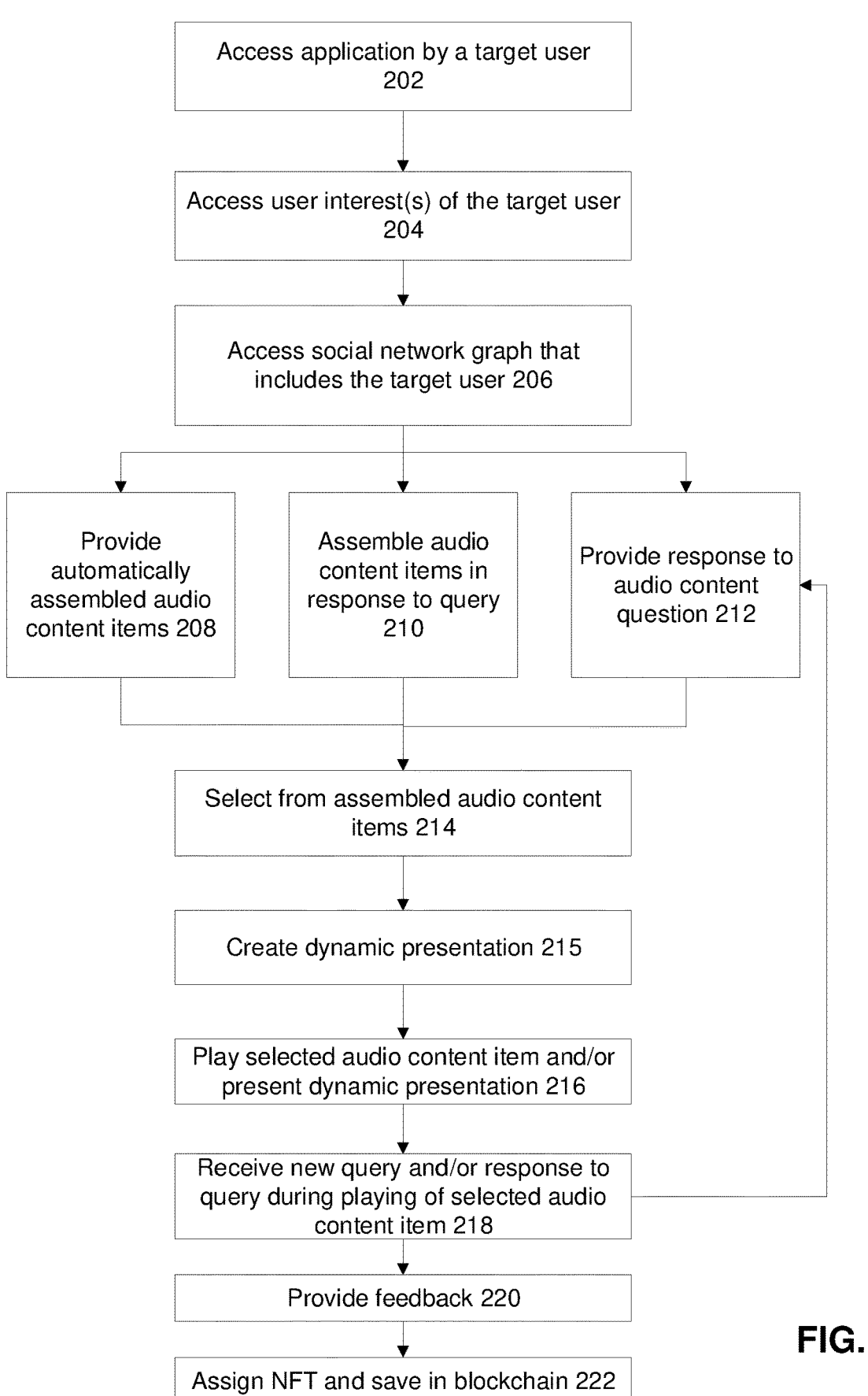
FIG. 2 is a flowchart of a method of a high level process of selecting and playing dynamically generated audio content items, in accordance with some embodiments of the present invention.
Figure 3:
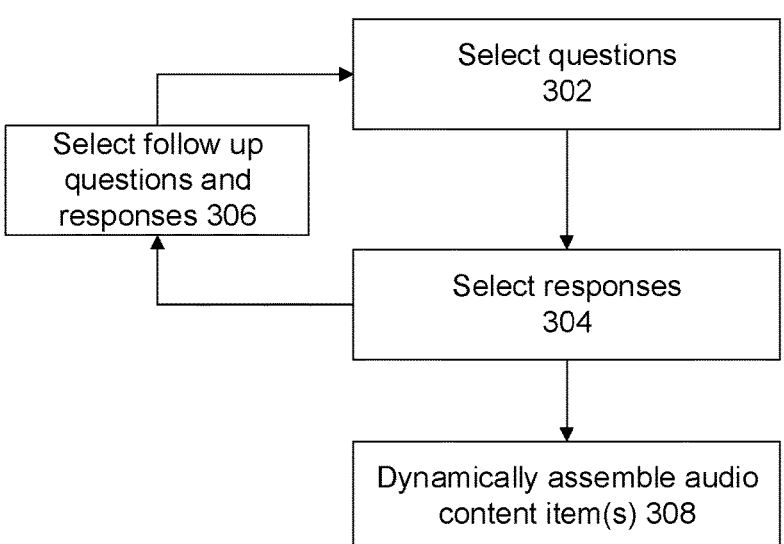
FIG. 3 is a flowchart of a method of dynamic generation of audio content of a panel including questions asked by a virtual moderator and responses by responders, in accordance with some embodiments of the present invention.
Figure 4:
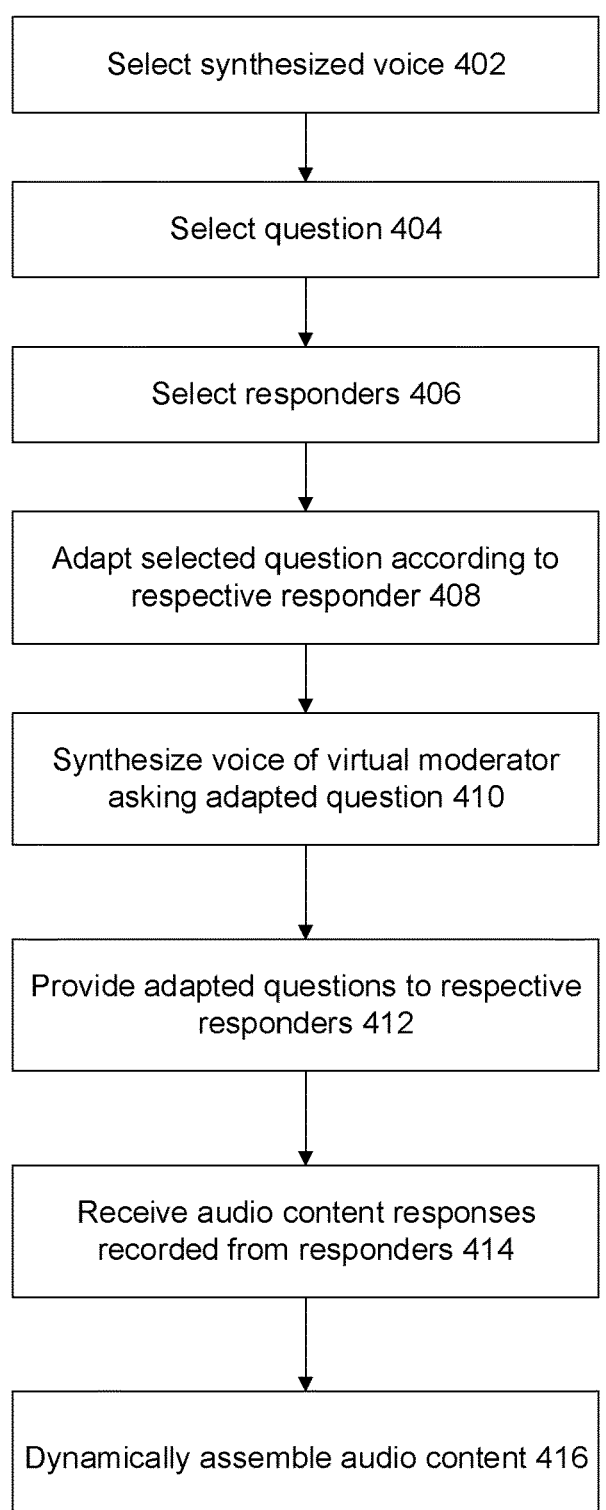
FIG. 4 is a flowchart of another method of dynamic generation of audio content of a panel including questions asked by a virtual moderator using a selected synthesized voice and responses by responders, in accordance with some embodiments of the present invention.
Figure 5:
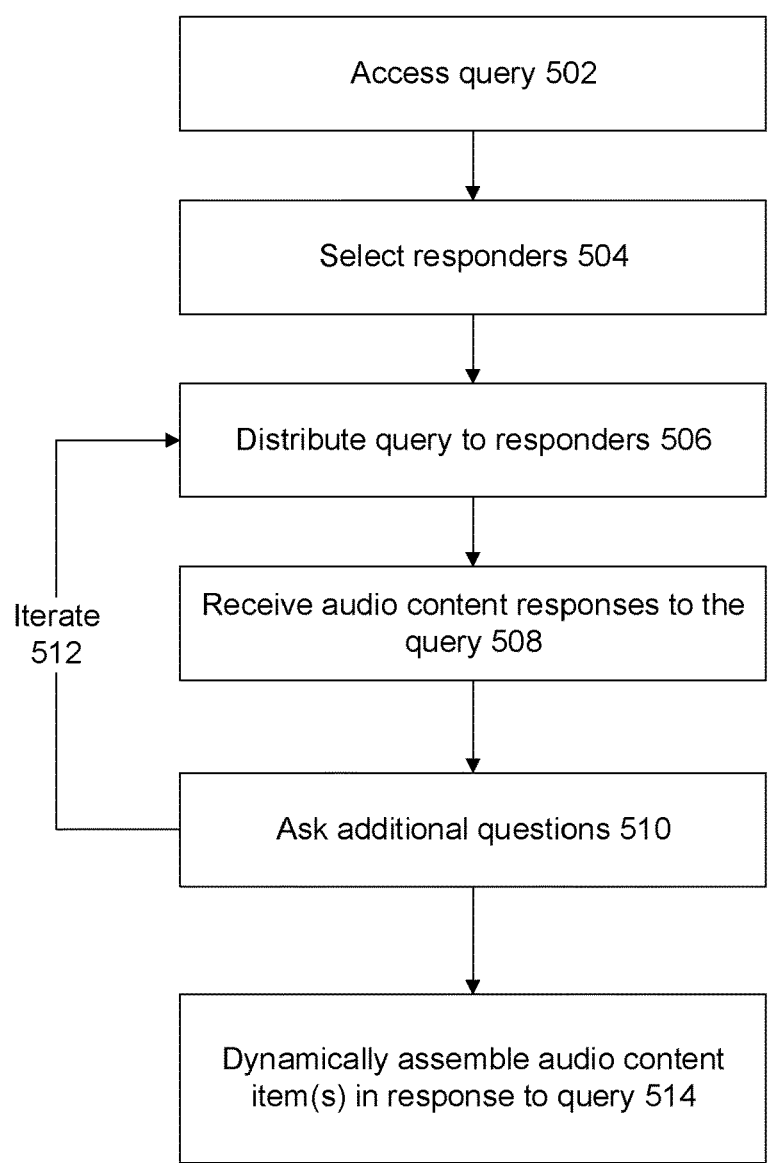
FIG. 5 is a flowchart of a method of dynamic generation of audio content in response to a query provided by a user, in accordance with some embodiments of the present invention.
Figure 6:
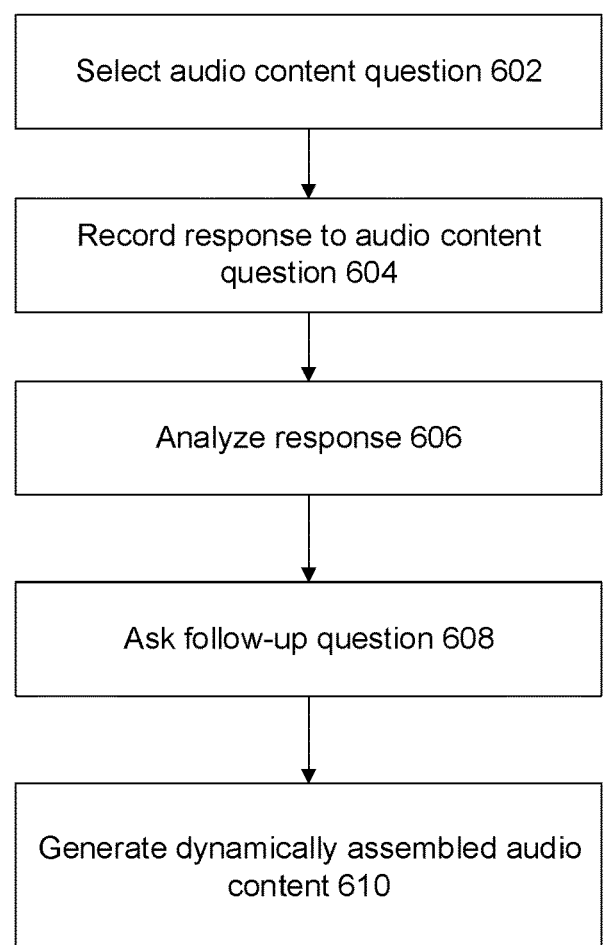
FIG. 6 is a flowchart of a method of providing one or more responses in response to one or more questions for dynamic generation of audio content, in accordance with some embodiments of the present invention.

Reference is now made to FIG. 1, which is a block diagram of components of a system 100 for dynamic generation of audio content of a panel including questions asked by a virtual moderator and responses by multiple responders, in accordance with some embodiments of the present invention. Reference is also made to FIG. 2, which is a flowchart of a method of a high level process of selecting and playing dynamically generated audio content items, in accordance with some embodiments of the present invention. Reference is also made to FIG. 3, which is a flowchart of a method of dynamic generation of audio content of a panel including questions asked by a virtual moderator and responses by responders, in accordance with some embodiments of the present invention. Reference is also made to FIG. 4, which is a flowchart of another method of dynamic generation of audio content of a panel including questions asked by a virtual moderator using a selected synthesized voice and responses by responders, in accordance with some embodiments of the present invention. Reference is also made to FIG. 5, which is a flowchart of a method of dynamic generation of audio content in response to a query provided by a user, in accordance with some embodiments of the present invention. Reference is also made to FIG. 6, which is a flowchart of a method of providing one or more responses in response to one or more questions for dynamic generation of audio content, in accordance with some embodiments of the present invention. System 100 may implement the acts of the methods described with reference to FIG. 2, at least by processor(s) 102 of a computing device 104 executing code instructions (e.g., code 106A) stored in a memory 106 (also referred to as a program store).

Computing device 104 automatically generates personalized audio content based on a social network graph 108B (e.g., created from an analysis of a social network 152A) and user interests (e.g., stored in user interest repository 108I) by aggregating audio content responses (e.g., stored in a response repository 108D) and corresponding audio content questions (e.g., stored in a question repository 108C, optionally mapped to the responses via a mapping dataset 108E). The questions may be asked by a virtual moderator 108H which speaks in a synthesized voice that emulates a voice (e.g., selected from a voice repository 108F) that is synthesized by a voice synthesizer machine learning model 108G (e.g., generative adversarial network (GAN)).

Social network 152A may be central, residing, for example, on one or more servers that are connected to computing device 104 via a communication network 112. For example, computing device 104 may compute social network graph 108B by issuing requests over a defined interface (e.g., application programming interface (API), software development kit (SDK) associated with social network 152. Alternatively or additionally, social network 152A may be hosted by computing device 104, and social network graph 108B may be implemented as social network 152A. Alternatively or additionally, social network 152A may be decentralized, such as posted user profiles stored by multiple connected computing devices. In such a case, computing device 104 may compute social network graph 108B, for example, by crawling code that crawls the social network 152 by followings links and/or relationships between user profiles.

Social network graph 108B stores relationships between the target user and the responding users. Social network graph 108B may store the types of relationships, for example, friends, family, colleagues, and the like. Social network graph 108B may store directional relationships, for example, whether a certain user is following another user, and/or is followed by another user.

Computing device 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing device 104 may be implemented. For example:

Computing device 104 acts as a centralized service provider that provides services to multiple client terminals 110A-B over network 112, for example, via a client code 150 executing on client terminals 110A-B that communicates with computing device 104. For example, an application programming interface (API), software development kit (SDK), functions and/or libraries and/or add-ons added to existing applications executing on client terminal(s), an application for download and execution on the client terminals that communicates with computing device 104, function and/or interface calls to computing device 104, a remote access section executing on a web site hosted by computing device 104 accessed via a web browser executing on the client terminal(s). For example, a querying client terminal 110A provides the query that includes at least one audio content question to computing device 104 via client code 150. Computing device 104 generates the personalized audio content (e.g., stored in repository 108A), and provides the personalized audio content for playing on a speaker 114 of target client terminal 110A. In another example, computing device 104 centrally dynamically generates personalized audio content for each of multiple users based on user interests of each respective user (e.g., according to user credentials of user accounts). Each target user may user their respective client terminal 110A to access their personalized audio content stored on computing device 104 for playing on speakers 114 of the respective client terminal 110A. Alternatively or additionally, personalized audio content newly created by computing device 104 are forwarded to respective client terminals 110A for local playing on speakers 114.

Computing device 104 is part of a decentralized network between querying client terminal(s) 110A and responding client terminal(s) 110B. Computing device 104 may distribute the query to multiple responding client terminal(s) 110B, receives back responses, and locally generates the personalized audio content.

Hardware processor(s) 102 of computing device 104 may be implemented, for example, as a central processing unit(s) (CPU), a graphics processing unit(s) (GPU), a field programmable gate array(s) (FPGA), a digital signal processor(s) (DSP), and an application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), a read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2-6 when executed by hardware processor(s) 102.

Computing device 104 may include data storage device(s) 108 for storing data, for example, one or more of: generated audio content repository 108A that stores the generated personalized audio content, social network graph 108B that documents relationships between users, question repository 108C that stores questions to ask, response repository 108D that stores audio content responses, mapping dataset 108E that maps between a question and user interest and received responses, voice repository 108F that stores voice samples of different people used for voice synthesis, voice synthesizer machine learning model 108G that synthesizes a voice according to a selected sample to ask a question, virtual moderator 108H that asks questions using the synthesized voice, and user interest repository 108I that stores interest of users. Data storage device(s) 108 may be implemented as, for example, a memory, a local hard-drive, virtual storage, a removable storage unit, an optical disk, a storage device, and/or as a remote server and/or computing cloud (e.g., accessed using a network connection).

Communication network 112 may be implemented as, for example, the internet, a local area network, a virtual network, a wireless network, a cellular network, a local bus, a point to point link (e.g., wired), and/or combinations of the aforementioned.

Computing device 104 may include a communication network interface 118 for connecting to communication network 112, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 and/or client terminal(s) 110A-B include and/or are in communication with one or more physical user interfaces 114 that include a microphone to record audio content and a speaker to play the generated audio content, and/or a mechanism for user interaction, for example, to enter user interests, and/or view an account of the user. Other exemplary physical user interfaces 114 include, for example, one or more of, a touchscreen, a display, gesture activation devices, a keyboard, a mouse, and voice activated software using speakers and microphone.

Client code 150 may be locally stored on a data storage device (e.g., memory) of client terminals 110A-B. Client code 150 may be obtained from computing device 104 and/or other servers, optionally over network 112. Client code 150 may include a GUI for selecting the generated personalized audio content to play, and/or for recording a new question of interest. Client code 150 may include code for communicating with computing device 104 over network 112.

Client terminal(s) 110A-B may be implemented as, for example, a desktop computer, a server, a virtual server, a network server, a web server, a virtual machine, a thin client, and a mobile device.

Referring now back to FIG. 2, at 202, a target user may access an application that dynamically generates audio content, as described herein. For example, the target user may log into an app installed on a mobile device (e.g., smartphone), such as client code 150 installed on target client terminal 110A which may communicate with computational device 104 running 106A, as described with reference to FIG. 1. In another example, the target user may use client terminal 110A to log into a server (e.g., computational device 104) executing code 106A, for example, using a web browser to access a web page hosting the application. In another example, the application is run as a plug-in and/or add-on to an existing social network (e.g., 152A of FIG. 1) hosted by a social network server (e.g., 152 of FIG. 1).

The target user may provide user credentials to access a set-up user account.

The application may provide additional features, for example, auto noise cleaning of recorded audio content, indicating to the target user when background noise is low for better recording (e.g., of responses, a query), providing gamification to incentivize content contribution and voice contribution, receive alerts of contacts of the target user (e.g., according to the social network graph) that are participating in audio content items, and/or receive alerts when new content items that include the synthesized voice and/or recordings of the target user are generated, sharing on social media that the target user is part of a generated content item.

The application may perform a background noise reduction on the assembled audio content item(s), and/or on the questions (e.g., obtained from the target user as a query) and/or on the responses obtained from responders (e.g., in response to one or more questions asked by the virtual moderator), as described herein.

The application may select a target background from multiple available backgrounds for insertion into a respective dynamically assembled audio content according to content discussed therein and/or according to a main question being asked. For example, when the dynamically assembled audio content is determined to be about a sports game, a background sound(s) of crowds cheering may be inserted.

Optionally, upon accessing the application, a graphical user interface (GUI) is presented, with one or more options defined by feature 208-212 described below. The user may click on the respective option to select the respective option.

At 204, one or more user interests of the target user are accessed. The user interest may be previously and/or dynamically defined by the target user, and stored in a user interest repository. For example, the target user selects user interest from a list of defined user interest, and/or manually enters user interests. In another example, the user interests of the target user may be learned by code, for example, analyzing content accessed by the target user and/or content generated by the target user, for example, using natural language processing (NLP) techniques that identify key words indicating user interests. In yet another example, the user interests are extracted from another dataset, for example, extracted from a posted personal profile of the target user posted on the social network.

User interest are stored for multiple users, which may participate as responders to questions, as described herein.

Optionally, user interests weighed with a weight, which may be manually set by the user and/or automatically set by code. For example, the user may rank their interests and/or assign then a score (e.g., 1-10) of preference. In another example, the weights are automatically computed, for example, by analyzing previously accessed content and/or previously generated content by the respective user. For example, users accessing and talking a lot about innovation and talking little about traffic are assigned a high weight for innovation and low weight for traffic.

An aggregation of the weighted user interests may be used to compute correlation with an aggregation of weighted interest of the target user and/or with questions, for selection of questions and/or responders, as described herein.

At 206, a social network graph that includes the target user is accessed. The social network graph defines links between the target user and other users, for example, contacts. Each node in the social network graph may represent a respective user, with edges between the nodes indicating that the respective users are connected, for example, are contacts of each other.

The social network graph may define relationships between users, for example, contacts, acquaintances, family, colleagues, and friends.

The social network graph may include weights between contacts, indicating the relative strength of connection between the target user and other users. For example, the target user may be closer to one contact over another contact. The weights may be manually set by the user and/or automatically computed by code, for example, the user ranks their contacts, and/or higher weights are computed for contacts the user interacts with more and lower weights are computed for contacts the user interacts with less.

The social network may define degrees of contacts, For example, direct contacts are directly connected to the user. Contacts of another contact of the user are second degree Contacts, etc.

The social network may define directional relationships between contacts, for example, using arrows and/or direction indicators. Users which initiate contacts with others may be assigned an arrow from the user to the other contacts. A user which is contacted by others (but may not necessarily initiate contact) may be assigned an arrow from the other contact to the user. In another example, one user can follow another user, and/or be followed by yet other users.

The social network graph may be automatically computed from an existing social network (e.g., hosted by a social network server), for example, using an application programming interface (API) of the social network, such as by querying contacts of the target user defined by the social network graph. In another example, the social network graph is created by the target user entering their contacts. Each user enters their own contacts, and the social network graph is created by linking all the contacts of all the users. In another example, the social network graph is defined by an existing social network.

At 208, automatically assembled audio content items may be provided for selection. The audio content may be customized for the target user. Alternatively or additionally, audio content items are dynamically assembled for different topics and/or based on different user provided queries. The target user may search existing audio content items to listen to, for example, using key words and/or topics.

The audio content items (optionally as described also with reference to 210 and/or 212) may be assembled from voice records (e.g., stored as audio files) and/or from audio recordings generating by converting text to voice (e.g., text which may be provided by responders and/or by the target user is synthesized to a selected voice, for example, as described with reference to 402 and/or 410 of FIG. 4).

The dynamically assembled content item(s) (optionally as described also with reference to 210 and/or 212) may be implemented according to one or more of: posted publicly for any user to access, privately shared only with the participating responders, and privately provided only to the target user, provided for single-use listening and then discarded, saved for future listening one or more times, and saved for a defined time interval after which the respective dynamically assembled audio content is made unavailable and/or discarded.

The audio content items play a panel discussion moderated by a virtual moderator asking questions about a certain topic to multiple responding users that are part of the social network graph of the target user (e.g., contacts of the target user defined by the social network graph). There may be multiple responses by multiple responders to the same and/or similar question, which is moderated by the virtual moderator. The multiple responders provide different views and/or approaches to the same/similar question. The question may be adapted and/or personalized for respective responders, as described herein.

The automatically assembled audio content items may be personalized for the target user, based on the social network graph and interests of the target user. For example, a list of automatically assembled audio content items are presented in the GUI, optionally a long with a brief description. For example: A discussion on what you can do to help employees be more creating, how to improve utilization of time, and most recommended places to visit with small kids. The target user selects one of the assembled audio content items for playing on a speaker(s) of a client terminal.

The audio content items may be assembled offline, and prepared for the target user so that they are ready when the user logs in. No trigger by the target user may be necessary.

An exemplary process for automatically assembling audio content items is described with reference to FIG. 3.

An exemplary process for automatically assembling audio content items using a synthesized voice for the virtual moderator is described with reference to FIG. 4.

At 210, the target user may provide a query, to which the audio content item is dynamically assembled as a response. The query may be for a question asked by the user, where instead of submitting the query to a search engine that searches text and/or other visual content on a network, the question of the query is asked by the virtual moderator, to which responses are obtained as audio content responses from responding users. The query and responses are assembled and provided to the target user for playing on speakers.

An exemplary process for using a query to obtain responses which are automatically assembled into audio content items is described with reference to FIG. 5.

At 212, the target user may act as a responder to a question asked by the virtual moderator, for example, in response to an automatically generated question and/or in response to a question asked by another user.

A list of pending audio content items with questions may be presented in the GUI, for example, in association with a brief indication (e.g., text, visual) of what the question is about. For example: Question regarding innovation, question regarding financial management strategy, and question regarding opinion on the new road being planned by the city. The target user may select which pending questions to listen to, and may record responses by speaking into a microphone. The asking of question is done by an automated visual moderator which may use a synthesized voice, as described herein.

An exemplary process for providing responses to a question asked by the virtual moderator is described with reference to FIG. 6.

At 214, a selection of one of the provided (e.g., presented in the GUI) dynamically assembled audio content items (e.g., as described with reference to 208 and/or 212) and/or one or the pending question (e.g., as described with reference to 210) is received. For example, the user clicks on the selection.

At 215, a dynamic presentation may be created for the selected dynamically assembled audio content item(s).

The dynamic presentation includes respective visual representations for one or more of the following people: each responder, the moderator, and the user. The visual representation may be generated as an avatar that visually simulates each person. The avatar may be, for example, an animation depicting a person, a synthesized person generated based on a real image of the respective person, and a synthesized life like person that is completely fake (e.g., randomly generated by a GAN). It is noted that non-human characters may be used in place of people, for example, animals, objects, and the like.

The dynamic presentation is generated to be time correlated to the dynamically assembled audio content item(s). Each avatar is generated to depict a speaking motion that is temporally correlated to the respective voice and/or audio recording of the respective responder of the dynamically assembled audio content. The dynamic presentation, when correlated with the dynamically assembled audio contents, provides an audio and visual experience depicting a sequentially arranged discussion, where questions are asked and responses are provided, by the avatars.

It is noted that the dynamic presentation may be created in other methods where the audio content item is assembled, for example, as described with reference to 208 of FIG. 2, 210 of FIG. 2, 308 of FIG. 3, 416 of FIG. 4, 514 of FIG. 5, and 610 of FIG. 6.

Different dynamic presentations may be generated for the same dynamically assembled audio content item(s), for example, using different avatar representations for the same respondents, such as according to user preference (e.g., animation or life-like images.

The dynamic presentation, when displayed in temporal correlation with the dynamically assembled audio content item(s) (or the dynamically assembled audio content item(s) without the presentation, provides a user experience where the responses are provided in a single session (over a short time interval) and/or are arranged in a logical sequential order, even though the actual responses were originally obtained during multiple different sessions (which take place over a longer time interval) and/or in a different order.

At 216, the selected dynamically assembled audio content items and/or the pending question is played on speakers of the client terminal, for example, loud speakers, headphones, a speaker of a phone, and Bluetooth speakers in a car.

The dynamic presentation, which is temporarily correlated with the selected dynamically assembled audio content item, may be presented on a display while the selected dynamically assembled audio content item is simultaneously played over speakers in a time correlated manner. For example, in virtual reality glasses, on a screen, and on a heads-up display of a vehicle.

At 218, during the playing of the selected dynamically assembled audio content and/or the selected question on the speaker of the client terminal, the target user may provide a new query (i.e., new question) by speaking into the microphone. For example, while listening to a moderated discussion on how to make employees more creative, the target user may ask "What is the best employee initiated innovation you have seen?". In another example, while the target user is answering a question about "What do you think about the city's plans to build the new road?" the user may ask "Why can't we expand one of the existing roads instead?".

Feature 212 may be iterated using the new query, for dynamically assembling one or more new audio content items based on the new query.

Alternatively or additionally, a question is presented to the target user while the selected dynamically assembled audio content is played. The question may be automatically generated by the virtual moderator (e.g., selected from a dataset of follow-up questions and/or linked to the content being discussed). For example, while listening to a discussion on the best financial investment for the upcoming year, the visual moderator may ask the target user a follow-up question (e.g., obtained from a dataset) of "And what is your opinion?". The question may be a query from another user on a similar/same topic, for example, while listening to the discussion on the best financial investment for the upcoming year, the virtual moderator asked the query from another user "Do you think real estate is still a good investment for next year?". The response of the target user may be included in audio content that is dynamically assembled for other users, and/or feature 210 may be iterated.

At 220, feedback is received from the target user, for example, via the GUI and/or via the speaker.

Optionally, the feedback is a feedback score (e.g., binary, classification category, number on a scale) indicating perceived likelihood of authenticity of the query (to which the target user responded, as in 212) and/or of one or more responses in the selected dynamically assembled audio content. The feedback score may indicative the target user's subjective assessment of authenticity, in an attempt to identify "fake" responses provided by real people (e.g., the real responder is lying in their answer) and/or to identify "fake" responses generated by bots rather than by real people, and/or to identify "fake" responses generated by someone else impersonating the responder designated to provide the response. When the feedback score is below a threshold, the response and/or query may be excluded from future generated audio content, and/or removed from a dataset that stores questions mapped to responses.

At 222, individual or groups of audio recording(s) may be assigned a respective unique non-fungible token (NFT). For example, each individual audio recording may be assigned its own unique NFT. The audio recording(s) and assigned NFT may be saved in a blockchain, which provides a public, secure, and tamper-proof record of ownership of the audio recording(s). The audio recording(s) with assigned NFT may be licensed.

Examples of audio recording(s) which may be assigned a respective NFT and saved in the blockchain include: the question and/or query asked by the target user, the response provided by a certain responder, audio recording(s) of the moderator, audio recording converted from text to speech, voices of the voice dataset, and synthesized audio content.

Referring now back to FIG. 3, at 302, one or more questions correlated with the user interest(s) of the target user are selected. The user interest may be randomly selected from a set of user interests, and questions correlated with the selected user interest may be randomly selected from a pool of available questions. Alternatively or additionally, the questions with highest correlation to one or more user interests (e.g., by considering weights assigned to the user interests) are selected. Alternatively or additionally, the user may select a preference for the user interest(s) for selection of questions.

Questions may be stored as audio content, and/or in a format used to synthesize voice by the virtual moderator (e.g., code, text read by the virtual moderator).

The questions may be stored in a dataset. Questions may be automatically generated by code, and/or have been provided by other users asking previous queries. Each question may be tagged with an indication of its content, for example, a text and/or other ID indicating the content, which may correspond to the available set of user interests. The indication of content may be obtained, for example, by NLP of the audio content recording of the question. Questions having IDs matching the target user interest may be selected.

Questions may be generic questions that are initially asked to responders as an introduction, before addressing topic specific questions, for example, asking about the background of the responder, asking about recent audio content items the responder has participated in, and/or asking about recent products, TV shows, books, and/or non profits for donations.

At 304, multiple audio recordings of responses by responders responding to the selected question(s) are selected.

The responses are selected by selecting responders that are linked to the target user in the social network graph, for example, direct links to the target user, indirectly linked to the target user (e.g., linked to one or defined maximal number of intermediate contacts, the last of which is directly linked to the target user), followers of the target user, and/or being followed by the target user. The criteria for selection may be manually defined by the target user and/or automatically set as system configurations.

The responders may be further selected according to a correlation between user interest of the responders and user interests of the target user, for example, responders sharing the most user interests and/or highest weighted user interests are selected. In another example, responders sharing the user interest of the target user used to select the question may be selected. For example, the user selects the user interest of "cooking", questions related to "cooking" are selected, and responders interested in "cooking" are selected.

Optionally, multiple responses by multiple responders to the same question are selected. The multiple responses are assembled into a virtual moderator led discussion, which may be designed to provide different views on the same topic/question.

Optionally, a mapping dataset documents questions, where each question is mapped to multiple responses received from multiple responders. The questions and/or responses may be stored in an audio content format (e.g., ready to be played on speakers), for example, MP3, WAV. Each question and/or response may be labelled with an indication of user interest and/or content of the respective question and/or response corresponding to user interest(s).

The mapping may be implemented, for example, as pointers pointing between a vector storing questions and a vector storing answers, a table of a column of questions and another related column of answers, and the like.

At 306, one or more follow-up questions may be selected in response to the received response from a responder, optionally by iterating 302-304.

The follow-up questions may be generic (e.g., selected randomly from a pool, and/or based on an analysis of the response, such as pattern of speech, words used, and/or expressed emotions), for example, "Is there anything else to add?", "Can you elaborate on that?", "Why do you think that?", "Can you give an example?".

The follow-up up question(s) may be selected from follow-up questions that are mapped to parent questions in the mapping dataset. The follow-up questions may be labelled with an indication of user interest(s) and/or context correlated to user interest(s). Each follow-up question may be mapped to multiple follow-up responses. Follow-up questions may be designated as parent questions and further mapped to other follow-up questions. The mapping between follow-up questions may be stored, for example, as a graph, where each node indicates a question (acting as a follow-up and/or parent) linked to follow-up questions by an edge, optionally directed.

When 302-304 are iterated, at 302, a sub-set of the follow-up questions to the parent questions may be selected according to user interest correlated with the user interest of the target user, and/or selected according to a correlation with context of the response and/or context of the parent question. At 304, a sub-set of follow-up responses to the follow-up questions may be selected according to user interest of the responders correlated with the user interest of the target user, and/or according to a correlation between context of the response and/or follow-up question and/or parent question.

Additional details of follow-up questions are provided, for example, with reference to 508 of FIG. 5.

At 308, one or more audio content items are dynamically assembled from a sub-set of the selected questions and a sub-set of the responses, which may include the sub-set of the follow-up questions and/or sub-set of the follow-up responses.

The sub-set of questions and/or responses included in the dynamically assembled audio content item may be selected by performing a natural language processing (NLP) analysis of the audio files documenting the selected questions and/or the responses, assigning a relevance score to each of the questions indicating relevance to the respective response and to the user interest(s) of the target user, and selecting the sub-set of the selected questions and/or the sub-set of the responses having relevance scores above a threshold.

Referring now back to FIG. 4, at 402, a synthesizing voice is selected from multiple synthesizing voices documents in a voice dataset. The synthesizing voice is used by the non-human virtual moderator to ask questions to responders and/or simulate a moderation of a discussion between responders (e.g., when each responder provides their own response offline and are not actually simultaneously having a discussion).

The voice dataset may document voice samples recorded from different people. The voice samples are used to synthesize the voice of the virtual moderator to emulate the voice of the respective person.

The synthesizing voices may be recorded, for example, from responders, the target user, and other members of the social network not selected as responders, and non-members of the social network (e.g., celebrities). The voice sample used for synthesizing may be extracted from submitted questions and/or responses, and/or may be specially recorded, for example, by asking a person to say something specific.

The voice dataset may document sample voices of famous personalities. The voice dataset may store licensed and/or licensable voices, which may be of famous personalities. Each famous personality may be associated (e.g., labelled) with an indication of respective specific content type, for example, a chef, a famous investor, a famous sports announcer, and a famous inventor.

The synthesizing voice may be selected, for example, randomly, to emulate the voice of the target user, to emulate the voice of one of the responders, selected by the target user, and/or selected according to the context of the question. The synthesizing voice may be selected according to a correlation between the respective specific content type of the respective famous personality documented in the voice dataset, and specific content type of the respective responder(s) and/or the question. For example, for a discussion on financial issues, a voice of a famous investor is selected for synthesis and used by the virtual moderator. In another example, a voice of a famous chef is selected to ask questions to restaurant owners.

At 404, one or more questions correlated with the user interest(s) of the target user are selected, for example, as described with reference to 302 of FIG. 3. Alternatively or additionally the question is a query provided by the user, for example, as described with reference to 502 of FIG. 5.

At 406, multiple responders linked to the target user in the social network and/or associated with user interest(s) correlated to the user interest(s) of the target user are selected, for example, as described with reference to 304 of FIG. 3. The responders may be linked to the target user by connections indicating that the target user is following the responders. Alternatively or additionally, the responders may be linked to the target user by connections indicating that the target user is being followed by the responders.

The responders may be selected using other criteria, which may be manually defined by the target user, automatically selected, and/or defined as system configuration settings, for example, according to relationship between the responders and target users (e.g., friends, acquaintances, colleagues) and/or according to number of intermediate contacts (e.g. no intermediate contacts i.e., responder is directly connected to the target user, one intermediate contact i.e., responder is directly connected to another contact that is directly connected to the target user, or two intermediate contacts, or more) and/or according to a rating of the respective responder (e.g., responders with ratings above a threshold are selected).

At 408, the question(s) may be adapted for the respective responder, generating adapted question(s). Optionally, the same question is adapted to each one of the responders, generating a respective adapted question(s) per respective responder. The adapted question(s) may represent a customization of the question(s) for each respective responder when directed to the respective responder by the virtual moderator.

Examples of adapting (e.g., customizing) the question(s) to the respective responder include one or more of: including a name of the respective responder (e.g., addressing the respective responder by name while asking a respective question), asking about background of the respective responder (e.g., "Joe, you had your startup IPO last year, tell us about that"), including an interest of the respective responder (e.g., "Isn't this exciting?"), selecting another synthesizing voice for the respective responder (e.g., selecting a voice of a person which the respective responder looks-up to, such as by following them closely), adjusting the question according to questions previously asked to the respective responder (e.g., "You previously asked - - - , what did you think of the responses to it?"), according to responses previously obtained from the respective responder (e.g., "You previously said - - - , doesn't that contradict your answer now?"), according to responses from other responders (e.g., "User - - - said - - - , do you agree?"), according to a relationship between the respective responder and the target user documented in the social network graph (e.g., "Your work colleague . . . "), and adding a prefix to the respective question according to an ordering of the respective question within multiple respective questions including follow-up questions (e.g., "Can I ask another question?", "And . . . ", "A third question is . . . ").

At 410, the voice of the virtual moderator is synthesized according to the selected synthesizing voice for asking the selected question(s) to the responders, optionally the adapted questions, by playing on a respective speaker of a respective client terminal of the respective responder.

Optionally, the synthesizing of the voice is obtained as an outcome of a trained machine learning model, optionally a generative adversarial network (GAN), in response to an input of a code representation of the question (e.g., the adapted question). The code representation may be, for example, non-audio encoding such as text which is "read" by the GAN, and/or other non-audio encoding "understood" by the GAN. A single GAN may synthesize multiple voices (e.g., in response to an input indicating which voice to use), and/or each one of multiple GANS is trained to synthesize a different voice. The GAN corresponding to the selected voice is used.

The synthesized voice may be created from, and/or the GAN may be trained on, a sample audio recording of a respective user. The same audio recording may be obtained, for example, in response to a selected question designed to obtain an optimal audio sample (e.g., short as possible while providing enough data to synthesize new voice content), in response to questions asked by the virtual moderator (e.g., generic, adapted questions, questions in response to a query) and/or in response to a query provided by the user.

The GAN may be trained for synthesizing the voice of the moderator using the selected voice, for example using the following exemplary procedure. A generator network is trained from the voice recording sample of the selected person (e.g. recording of the audio response provided by the target user), to generate an outcome of audio content synthesis of the voice of the target user in response to an input of non-audio data representation. A detector network is trained from a training dataset of audio content synthesizing the selected voice (e.g., of the target user) generated by the generator network labelled with an indication of synthesis, and the voice recording sample (e.g., audio response) of the voice of the selected person (e.g., target user) labelled with an indication of real voice, to generate an outcome of synthesis or real voice in response to an input of an audio content. The generator network and the detector network are jointly trained using cost functions directly opposing each other, such that the generator network generates the synthesized audio content that when fed into the detector network generates the indication of real voice, to obtain a trained generator network.

Non-audio data representation of the question(s), such as the adapted question(s), is into the trained generator network to obtain the synthesized voice of the target user as the moderator as an outcome.

At 412, respective audio content question items, in which the virtual moderator asks the question, optionally the respective adapted question, optionally in the selected synthesized voice, are provided to each respective responder. Each respective audio content question items is played on a respective speaker of the respective responder.

The respective audio content question item may be presented in the GUI of the application upon log-in of the respective responder to the application, for example, as described with reference to 212 of FIG. 2.

At 414, audio content response(s) to the respective question(s), optionally the respective adapted question(s) are recorded from a respective microphone of the respective client terminal of the respective responder. The recordings may be sent over a network to a server, which may store the recordings in the mapping dataset that documents questions and corresponding responses.

At 416, audio content is dynamically assembled from the question, optionally the adapted question asked by the virtual moderator using the synthesized voice and the multiple audio content responses obtained from the multiple selected responders. The audio content is provided for playing on speakers, for example, presented in the GUI of the application as a selection for listening to, for example, as described with reference to 208 of FIG. 2.

Referring now back to FIG. 5, at 502, a query is accessed. The query may be contrasted with a text based search query entered into an internet search engine that returns network documents as a result, in that the query described herein is an audio query which is used as a trigger to obtain verbal audio recording responses from responders, where the audio recording of the query and responses are dynamically assembled into audio content for playing on a speaker(s). The audio query is used to "search" the minds of the responders to obtain "results" in the form of audio responses, which are further assembled into audio content that provides a panel discussion moderated by the virtual moderator optionally using the synthesized voice.

The query may be obtained from the client terminal of the target user.

The query may be an audio content question recorded by the target user speaking into the microphone of the client terminal. The query may be labelled and/or associated with an indication of the user interest of the target user, and/or labelled with an indication of content of the question (e.g., by analyzing the question, such as by NLP methods).

Alternatively, the query is provided as a text entry which may be typed by the target user. The text is used to synthesize a selected voice, optionally of the target user, saying the text of the query and stored as an audio content item. For example, the text is fed into a trained GAN that outputs an audio file of the synthesized voice saying the text.

At 504, responders linked to the target user in the social network and/or associated with user interest(s) correlated to the user interest(s) of the target user are selected, for example, as described with reference to 406 of FIG. 4.

At 506, the audio content query may be distributed to client terminals of the selected responders, for example, by sending a copy of the audio content query to the client terminals. Alternatively, the distribution is done by centrally storing the audio content query on a server, and streaming and/or forwarding the audio content to responding users accessing the audio content query.

The question of the query may be customized and/or adapted for respective responders, for example, as described with reference to 408 of FIG. 4.

At 508, multiple audio content responses to the query are received from the selected responders. The audio content responses are recorded from microphones of the client terminals of the selected responders, in response to the virtual moderator speaking in the synthesized voice asking the audio content question of the query, optionally the adapted question.

At 510, additional selected questions and/or follow up questions may be asked by the virtual moderator. The additional questions may be selected before the query is asked to the responder(s). Additional questions and/or follow up questions may be selected and asked after an analysis of a response to the query and/or to previously asked parent questions.

The selected additional questions may be documented in a dataset, and selected according to a correlation with the query and/or with the user interest(s) of the target user. The selected additional questions and the query may be distributed to the client terminals of the selected responders. The virtual moderator asks the additional questions and the audio content question of the query, optionally using the selected synthesized voice.

An exemplary approach for automatically selecting and asking additional and/or follow-up questions is now described. A certain audio content response of a certain responder is analyzed, for example, using NLP approaches. One or more follow-up questions, which may be documented in a dataset, are selected according to the analysis of the certain audio content response. The follow-up question(s) are asked by the virtual moderator by playing on the speaker of the client terminal of the certain responder. A follow-up audio content response is recorded from the certain responder on a microphone of the client terminal of the certain responder. The follow-up audio content response(s) and the follow-up question(s) may be included in the dynamically assembled audio content.

The additional and/or follow-up questions may be adapted and/or customized for the respective responder, for example, as described with reference to 408 of FIG. 4.

Additional details of follow-up questions are provided, for example, with reference to 306 of FIG. 3.

At 512, one or more features described with reference to 506-510 may be iterated, as part of the virtual moderator moderation process, to ask the responder(s) additional questions and/or additional follow-up questions.

At 514, audio content item(s) are dynamically assembled from the audio content response(s) and the query, optionally the query, and optionally the additional and/or follow-up questions.

Referring now back to FIG. 6, at 602, one or more audio content questions are selected by the target user. The audio content questions may be queries submitted by another user(s), and/or questions selected (e.g., from a question dataset that stores question off-line) for generating a dynamically assembled content item for another user(s). The other users may be linked to the target user by connections of the social network graph, and/or other users may have user interests that correlate to the user interests of the target user. The target user may be selected for responding to the audio content question, for example, as described with reference to 406 of FIG. 4.

The question may be adapted and/or customized to the target user, for example, as described with reference to 408 of FIG. 4.

The selected question is played on a speaker of the client terminal of the target user.

At 604, a response of the target user to the question is recorded by a microphone associated with the client terminal of the target user.

The response may be stored in the dataset and mapped to the one question, as described herein.

Alternatively or additionally, the target user may provide the response in text form (e.g., by typing the response). In such implementation, an audio content response is generated from the text by synthesizing the voice of the target user reading the text, for example, using a trained GAN, as described herein.

At 606, the audio response may be analyzed, for example, using NLP approaches.

At 608, one or more follow-up and/or additional questions may be asked by the virtual moderator, optionally using the synthesized voice, according to the analysis.

The follow-up and/or additional questions may be asked, for example, as described with reference to 306 of FIG. 6, and/or 510 of FIG. 5.

At 610, the recorded response(s) to the query and/or additional question(s) and/or follow-up question(s) may be included in the dynamic assembling of one or more new audio content items of one or more other users linked to the target user by connections stored in the social network graph. The new audio content item(s) may be provided to the other user(s) for playing on speakers of respective client terminals.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant audio content formats will be developed and the scope of the term audio content is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of dynamic generation of audio content in response to a query, comprising:

accessing a query from a client terminal of a target user, the query indicating audio content question recorded by the target user speaking into a microphone of the client terminal;

accessing at least one user interest of the target user;

accessing a social network graph that includes the target user;

selecting a plurality of responders linked to the target user in the social network and associated with user interests correlated to the at least one user interest of the target user;

distributing the query via a virtual moderator in a synthesized voice, selected from a voice dataset documenting different synthesizing voices, to a plurality of client terminals of the selected plurality of responders;

receiving a plurality of audio content responses to the query from the selected plurality of responders, each response recorded by a microphone of a respective client terminal in response to the virtual moderator's synthesized voice presentation of the query;

dynamically assembling at least one audio content that includes portions of the recorded audio responses together with at least part of the original audio query; and providing at least one dynamically assembled audio content for selection thereof for playing on a speaker of the client terminal.

2. The computer implemented method of claim 1, further comprising selecting additional questions documented in a dataset, correlated with the query and the at least one user interest, and distributing the selected additional questions and the query to the plurality of client terminals, wherein the virtual moderator asks the additional questions and the audio content question of the query.

3. The computer implemented method of claim 1, further comprising:

analyzing a certain audio content response of a certain responder using natural language processing (NLP);

selecting a follow-up question document in a dataset according to the analysis of the certain audio content response;

asking the follow-up question by the virtual moderator by playing on a speaker of a client terminal of the certain responder;

receiving a follow-up audio content response from the certain responder recorded on a microphone of the client terminal of the certain responder; and including the follow-up audio content response and the follow-up question in the at least one dynamically assembled audio content.

4. The computer implemented method of claim 1, further comprising:

playing a selected dynamically assembled audio content on the speaker of the client terminal;

receiving a new query recorded from the microphone of the client terminal during playing of the selected dynamically assembled audio content;

iterating, for the new query the selecting the plurality of responders, the distributing, and the receiving the plurality of audio content responses; and dynamically assembling at least one new audio content from the plurality of audio content responses and the new query.

5. A system for dynamic generation of audio content in response to a query, comprising:

at least one processor executing a code for:

accessing a query from a client terminal of a target user, the query indicating audio content question recorded by the target user speaking into a microphone of the client terminal;

accessing at least one user interest of the target user;

accessing a social network graph that includes the target user;

selecting a plurality of responders linked to the target user in the social network and associated with user interests correlated to the at least one user interest of the target user;

distributing the query via a virtual moderator in a synthesized voice, selected from a voice dataset documenting different synthesizing voices, to a plurality of client terminals of the selected plurality of responders;

receiving a plurality of audio content responses to the query from the selected plurality of responders, each response recorded by a microphone of a respective client terminal in response to the virtual moderator's synthesized voice presentation of the query;

dynamically assembling at least one audio content that includes portions of the recorded audio responses together with at least part of the original audio query; and providing at least one dynamically assembled audio content for selection thereof for playing on a speaker of the client terminal.

6. The system of claim 5, further comprising code for selecting additional questions documented in a dataset, correlated with the query and the at least one user interest, and distributing the selected additional questions and the query to the plurality of client terminals, wherein the virtual moderator asks the additional questions and the audio content question of the query.

7. The system of claim 5, further comprising code for:

analyzing a certain audio content response of a certain responder using natural language processing (NLP);

selecting a follow-up question document in a dataset according to the analysis of the certain audio content response;

asking the follow-up question by the virtual moderator by playing on a speaker of a client terminal of the certain responder;

receiving a follow-up audio content response from the certain responder recorded on a microphone of the client terminal of the certain responder; and including the follow-up audio content response and the follow-up question in the at least one dynamically assembled audio content.

8. The system of claim 5, further comprising code for:

playing a selected dynamically assembled audio content on the speaker of the client terminal;

receiving a new query recorded from the microphone of the client terminal during playing of the selected dynamically assembled audio content;

iterating, for the new query the selecting the plurality of responders, the distributing, and the receiving the plurality of audio content responses; and dynamically assembling at least one new audio content from the plurality of audio content responses and the new query.

9. A non-transitory medium storing program instructions for dynamic generation of audio content in response to a query, which when executed by at least one processor, cause the at least one processor to:

access a query from a client terminal of a target user, the query indicating audio content question recorded by the target user speaking into a microphone of the client terminal;

access at least one user interest of the target user;

access a social network graph that includes the target user;

select a plurality of responders linked to the target user in the social network and associated with user interests correlated to the at least one user interest of the target user;

distribute the query via a virtual moderator in a synthesized voice, selected from a voice dataset documenting different synthesizing voices, to a plurality of client terminals of the selected plurality of responders;

receive a plurality of audio content responses to the query from the selected plurality of responders, each response recorded by a microphone of a respective client terminal in response to the virtual moderator's synthesized voice presentation of the query;

dynamically assemble at least one audio content that includes portions of the recorded audio responses together with at least part of the original audio query; and provide at least one dynamically assembled audio content for selection thereof for playing on a speaker of the client terminal.

10. The non-transitory medium of claim 9, further comprising program instructions, which when executed by at least one processor, cause the at least one processor to: select additional questions documented in a dataset, correlated with the query and the at least one user interest, and distribute the selected additional questions and the query to the plurality of client terminals, wherein the virtual moderator asks the additional questions and the audio content question of the query.

11. The non-transitory medium of claim 9, further comprising program instructions, which when executed by at least one processor, cause the at least one processor to:

analyze a certain audio content response of a certain responder using natural language processing (NLP);

select a follow-up question document in a dataset according to the analysis of the certain audio content response;

ask the follow-up question by the virtual moderator by playing on a speaker of a client terminal of the certain responder;

receive a follow-up audio content response from the certain responder recorded on a microphone of the client terminal of the certain responder; and include the follow-up audio content response and the follow-up question in the at least one dynamically assembled audio content.

12. The non-transitory medium of claim 9, further comprising program instructions, which when executed by at least one processor, cause the at least one processor to:

play a selected dynamically assembled audio content on the speaker of the client terminal;

receive a new query recorded from the microphone of the client terminal during playing of the selected dynamically assembled audio content;

iterate, for the new query the selecting the plurality of responders, the distributing, and the receiving the plurality of audio content responses; and dynamically assemble at least one new audio content from the plurality of audio content responses and the new query.

13. The computer implemented method of claim 1, wherein distributing the query to said plurality of client terminals of the selected plurality of responders comprises customizing the query for each respective responder of the selected plurality of responders.

14. The computer implemented method of claim 1, wherein said customizing is selected from a group consisting of: addressing the respective responder by name, background details of the respective responder, adjusting the query according to a response to a previous query, and adjusting the query according to previously asked query.

15. The computer implemented method of claim 1, wherein said synthesized voice is generated by a generative adversarial network (GAN) machine learning model trained on a sample audio recording of a respective user obtained in response to a selected question designed to obtain an optimal audio sample in response to questions asked by the virtual moderator and/or in response to a query provided by the respective user.

\*    \*    \*    \*    \*